June 7, 1927.     O. E. STOKES     1,631,653
BUMPER
Filed Nov. 19, 1923

Witnesses:
W. F. Kilroy
B. W. Jackson

Inventor:
Oscar E. Stokes
By Kile & Kile
Attys

Patented June 7, 1927.

1,631,653

UNITED STATES PATENT OFFICE.

OSCAR E. STOKES, OF STREATOR, ILLINOIS.

BUMPER.

Application filed November 19, 1923. Serial No. 675,579.

My invention relates to an improvement in bumpers, and more particularly to a bumper adapted for use at the front or rear end of vehicles so as to receive any impact directed against the vehicle.

The invention has among its objects the production of a device of the kind described which is simple, convenient, compact, durable, reliable, efficient and satisfactory for use wherever found applicable.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Figure 1:
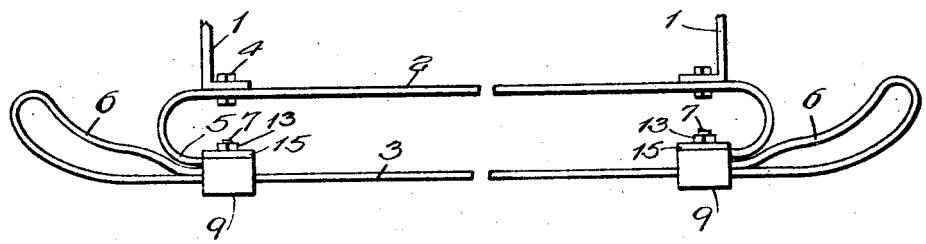
Fig. 1 is a top plan view of my device.
Figure 2:
Fig. 2 is a front elevation of the same.

In the drawings, wherein I have illustrated the preferred embodiment of my invention, 1 indicates brackets of any suitable or preferred construction, extending from the front or rear ends of a vehicle and designed to support and carry the bumper proper.

The bumper consists of three bars, 2 being the central bar and 3 and 3′ being the top and bottom bars. The central bar 2 is adapted to be connected across and secured adjacent its ends to the brackets 1 by means of any suitable fastening means, as for instance bolts 4, the ends of said bar being bent upon themselves as at 5 so as to render said ends resilient against direct pressure or thrust.

The ends of the bars 3 and 3′ are bent upon themselves so as to provide elongated closed loops 6, the ends of said loops having registering apertures therethrough adapted to receive bolts 7, provided with the usual heads 8.

A tie or bracket member, substantially of C-shape, has a front wall 9 and ends 10 formed rearwardly toward one another, these ends 10 having longitudinally extended slots 11 opening thereinto from the free ends. The wall 9 is formed with recesses 12 therein on the rear thereof in registry with the slots 11 and adapted to receive the bolt heads 8 and prevent rotation of the same so that nuts 13 may be tightened in place on the bolts to hold the device assembled, in a manner to be hereinafter described. The recesses 12 open into a central enlarged recess 14, as shown.

A strip or plate 15 is adapted to be clamped against the rear surface of the ends 10 of each tie member, said plates being provided with bolt holes adjacent the ends to receive the bolts 7 and with a bolt hole intermediate the end bolt holes, to receive a bolt 16 passing through the free end of the bar 2.

Figure 3:
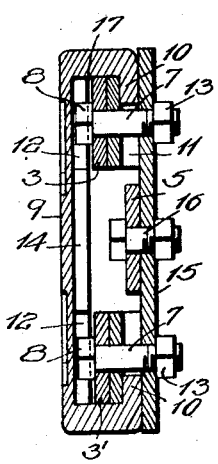
Fig. 3 is a sectional view taken substantially on line 3—3 of Fig. 2.
Figure 4:
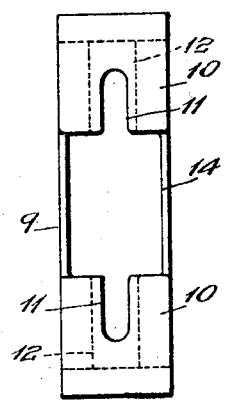
Fig. 4 is a rear elevation of one of the tie members.

To assemble the bumper parts, the bolts 7 are inserted through the aligned bolt holes at the inner ends of the loops 6, the lower bar 3′ then dropped into place with the bolt 7 in the registering slot and recess of the tie member 9, as shown more particularly in Fig. 3; then the other rod 3 is slipped into the upper end of the tie member and held in place thereat while the rear plate 15 is slipped over the projecting free ends of the bolts 7, and the nuts 13 placed thereon and tightened to clamp the parts 9 and 15 together. The ends of the bar 2 may be now bolted to the plate or strip 15, or, if desired, the bar 2 may be already bolted to the strip 15 before bolting said strip to the tie member 9.

It will be noted that there is a space 17 provided between the bars 3 and 3′ and the opposed wall of the tie member so that in case of any movement or play between the two the device will not rattle. There is no possibility of the bars 3 or 3′ dropping or becoming displaced, even though the nuts 13 should become loose, and the parts are held clamped so that there is no rattling. Sufficient room is provided between the opposed surfaces of the tie member and plate 15 to permit the insertion of a wrench or other tool to engage the head of the bolt 16, when it is desired to tighten or loosen the same. The bumper is not only attractive in appearance, but is of great strength and rigidity coupled with a maximum of resiliency, so that in case of impact the blow is cushioned or eased and yet the device will not in most cases be demolished or injured or rendered inoperative.

Having thus described my invention, it is obvious that various immaterial modifica- tions may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A bumper comprising a pair of bars, a tie member having its free ends turned back and slotted, a strip adapted to be arranged longitudinally of said tie member and having bolt holes therethrough, bolts extended through the ends of said bars and through said slots to interconnect said parts, and means on said tie member engageable to lock said bolt against rotation.

2. A bumper comprising a pair of parallel bars, a tie member having its ends slotted and bent toward one another and spaced from the opposed wall of said member, said wall recessed adjacent each end to slidably and nonrotatably receive a bolt-head therein, whereby said bars may be received between the opposed faces of said member, and bolts positioned through said bars and slots and having their heads in said recesses.

3. A bumper comprising a pair of parallel bars, a pair of substantially C-shaped tie members, the ends of said members having slots therein, the rear wall of each of said members having recesses therein in alignment with said slots to slidably receive bolts therein and lock them against rotation, a strip adapted to be arranged longitudinally of each tie member and having bolt holes in alignment with said slots and recesses, bolts extended through the ends of said bars and said strips to clamp said parts together, and a bar arranged intermediate said first mentioned bars and having its ends bent toward one another and secured to said strips.

4. An automobile bumper comprising a elongated flat ring formed by a front bar and a supplemental rear bar spaced apart and united by clamps within which are embraced the end portions of said bars respectively, said clamps embracing also portions of said front bar intermediate its ends, the latter being formed into loops extending laterally beyond the periphery of said flat ring and said rear bar having its end portions curved forward from the plane of its body to the region of said clamps respectively, to serve as spacing means, said curved portions comprising reverse bends symmetrically disposed rearward of the clamping regions.

5. In a device of the character described, the combination with a pair of vertically spaced buffer bar elements having their respective extremities bent back upon themselves to comprise loops, of a supporting bar having portions extending curvilinearly between corresponding loop portions of said elements.

6. In a device of the character described, the combination with a pair of vertically spaced buffer bar elements, each provided with terminal loop portions, of a C-shaped supporting member having portions adjacent its extremities disposed between corresponding loop portions of the upper and lower elements and secured adjacent its extremities to said elements to support the weight thereof.

7. As a new article of manufacture, a bracket clamp having a body portion and arms connected therewith and projecting from their points of connection with said body portion toward each other in spaced relation to said body portion, said arms terminating to provide a central opening affording access to the spaces between respective arms and adjacent parts of said body portion, the lengths of said arms being such with reference to the size of said opening as to adapt said arms in themselves to secure members fitted into said spaces and receivable through said opening against torsional movement with respect to said body portion.

8. As a new article of manufacture, a retaining device consisting of a recessed body portion and a pair of arms in substantially a common plane and connected respectively to said body portion in spaced relation thereto, said arms terminating in spaced relation to each other and being provided with bolt receiving apertures opening to the ends of said arms.

9. As a new article of manufacture, a retaining device comprising a body portion having arms arranged in substantial parallelism therewith and connected to it at its ends, said arms being disposed substantially in a common plane, and being spaced from each other to permit of the introduction between them of an article receivable between either of said arms and the body portion, said arms being provided with bolt receiving apertures opening to their respective ends.

10. In a device of the character described, the combination with a supporting bar of a clamp member having a body portion and a pair of arms connected with said body portion and spaced from each other and from said portion, the ends of said arms substantially abutting said supporting bar above and beneath it and being provided with bolt receiving apertures, upper and lower bumper members having portions disposed respectively between said arms and said body portion, a plate secured to the rear of said supporting bar and abutting said arms, and bolts securing said plate to each of said arms and each of said upper and lower bumper members, the body portion of said clamp being formed to confine the heads of said bolts against rotation.

11. In a device of the character described, the combination of a resilient supporting member provided with portions in substantial alignment, plates connected respectively with said portions, bolts projecting forwardly from said plates and respectively above and below the adjacent portions of said member, upper and lower buffer bar elements mounted respectively on said bolts, and a device including arms positioned respectively by said bolts; and a body portion connected with said arms and extending across the heads of said bolts in concealing relationship thereto.

12. An automobile bumper comprising an elongated flat ring formed by a front bar and a supplemental rear bar spaced apart and united by clamps within which are embraced the end portions of said bars respectively, said clamps embracing also portions of said front bar intermediate its ends, the latter being formed into loops extending laterally beyond the periphery of said flat ring.

13. An automobile bumper comprising an elongated flat ring formed by a front bar and a supplemental rear bar spaced apart and united by clamps within which are embraced the end portions of said bars respectively, said clamps embracing also portions of said front bar intermediate its ends, the latter being formed into loops extending laterally beyond the periphery of said flat ring and said rear bar having its end portions curved forward from the plane of its body to the region of said clamps respectively, to serve as spacing means.

In testimony whereof, I have hereunto signed my name.

OSCAR E. STOKES.